US007694313B2

(12) United States Patent
O'Shaughnessy et al.

(10) Patent No.: US 7,694,313 B2
(45) Date of Patent: Apr. 6, 2010

(54) TERMINATING DEVICE AND A METHOD OF OPERATING A TERMINATING DEVICE CONFIGURED TO COMMUNICATE AVAILABILITY STATUS DIRECTLY BETWEEN TERMINATING DEVICES

(75) Inventors: Kevin Michael O'Shaughnessy, Galway (IE); Ivo Ruben Willem Jager, Dublin (IE)

(73) Assignee: Palm, Inc., Sunnyvale, CA (US)

( * ) Notice: Subject to any disclaimer, the term of this patent is extended or adjusted under 35 U.S.C. 154(b) by 584 days.

(21) Appl. No.: 11/615,801

(22) Filed: Dec. 22, 2006

(65) Prior Publication Data

US 2008/0153538 A1 Jun. 26, 2008

(51) Int. Cl.
*G06F 3/00* (2006.01)
(52) U.S. Cl. .................... 719/321; 455/550.1; 455/424
(58) Field of Classification Search ............. 455/550.1; 709/203, 206, 224; 719/321
See application file for complete search history.

(56) References Cited

U.S. PATENT DOCUMENTS

| 6,807,562 | B1 | 10/2004 | Pennock et al. |
| 7,382,773 | B2 | 6/2008 | Schoeneberger et al. |
| 7,444,160 | B1 | 10/2008 | Fournier et al. |
| 2004/0141508 | A1 | 7/2004 | Schoeneberger et al. |
| 2005/0210113 | A1* | 9/2005 | Kasuga et al. ............... 709/206 |
| 2006/0072726 | A1 | 4/2006 | Klein et al. |
| 2006/0148503 | A1 | 7/2006 | Lasisi et al. |
| 2006/0172753 | A1 | 8/2006 | Sung et al. |
| 2007/0037598 | A1 | 2/2007 | Ayyasamy et al. |
| 2007/0135106 | A1 | 6/2007 | Sung et al. |
| 2007/0266077 | A1* | 11/2007 | Wengrovitz ................. 709/203 |
| 2008/0059627 | A1 | 3/2008 | Hamalainen et al. |
| 2008/0068447 | A1 | 3/2008 | Mattila et al. |
| 2008/0153538 | A1 | 6/2008 | O'Shaughnessy et al. |
| 2008/0155567 | A1 | 6/2008 | O'Shaughnessy et al. |
| 2008/0205630 | A1 | 8/2008 | Deshpande |

FOREIGN PATENT DOCUMENTS

WO WO 2004/034718 A1 4/2004

OTHER PUBLICATIONS

PCT International Search Report and Written Opinion, PCT/US07/87961, Aug. 21, 2008, 9 pages.
PCT International Search Report and Written Opinion, PCT/US07/87959, May 5, 2008, 7 pages.
U.S. Office Action, U.S. Appl. No. 11/615,805, Jul. 28, 2009, 14 pages.

(Continued)

*Primary Examiner*—David Q Nguyen
(74) *Attorney, Agent, or Firm*—Fenwick & West LLP

(57) ABSTRACT

A system and a method are disclosed for a terminating device for a communications network which comprises an application program configured to utilize an availability status of a user; a communications interface configured to receive and/or transmit data and a presence engine. The presence engine is configured to provide the communications interface with data representative of an availability status of a user, and cause the communications interface to transmit the data directly to another terminating device. Alternatively, or additionally, the presence engine is configured to receive data representative of an availability status of the user directly from another terminating device, and make available data representative of the received availability status of a user to the application program.

18 Claims, 11 Drawing Sheets

OTHER PUBLICATIONS

Extended European Search Report, European Application No. 07865816.8, Dec. 28, 2009, 7 pages.

Extended European Search Report, European Application No. 07865814.3, Dec. 28, 2009, 7 pages.

Archive of "Push to Talk - Accelerate Your Business at the Touch of a Button," Cingular, 3 pages, [Online] [Archived by http://archve.org on Jun. 21, 2006; Retrieved on Dec. 14, 2009] Retrieved from the Internet<URL:http://web.archive.org/web/20060621153859/http://cr.ucdavis.edu/comm srv/wireless/ptt_datasheet.pdf>.

* cited by examiner

TERMINATING DEVICE AND A METHOD OF OPERATING A TERMINATING DEVICE CONFIGURED TO COMMUNICATE AVAILABILITY STATUS DIRECTLY BETWEEN TERMINATING DEVICES

CROSS REFERENCE TO RELATED APPLICATIONS

This application is related to U.S. patent application Ser. No. 11/615,792, filed Dec. 22, 2006, and titled "Data Processing Apparatus and a Method of Operating Data Processing Apparatus for Setting a State of a User Application", having inventors Kevin Michael O'Shaughnessy and Ivo Ruben Willem Jager, and assigned to the same entity as the present application, the contents of which is hereby incorporated by reference.

This application is related to U.S. patent application Ser. No. 11/615,797, filed Dec. 22, 2006, and titled "Data Processing Apparatus and a Method of Operating Data Processing Apparatus for Generating Representations of Availability Status for Application Programs", having inventors Kevin Michael O'Shaughnessy and Ivo Ruben Willem Jager, and assigned to the same entity as the present application, the contents of which is hereby incorporated by reference.

This application is related to U.S. patent application Ser. No. 11/615,805, filed Dec. 22, 2006, and titled "A Presence Engine and Method of Operating a Presence Engine for Encoding or Decoding Availability Status Into a Signal Representative of an Audio Signal", having inventors Kevin Michael O'Shaughnessy and Ivo Ruben Willem Jager, and assigned to the same entity as the present application, the contents of which is hereby incorporated by reference.

BACKGROUND

1. Field of Art

The present disclosure relates to a terminating device and a method of operating a terminating device, configured to communicate availability status directly between terminating devices.

2. Description of the Related Art

Communications applications are known that take a predetermined action dependent upon the communications availability status that has been recorded for a terminating device in a communications network. Examples of such communications applications include instant messaging and push to talk (PTT) applications.

Conventional push to talk (PTT) applications are known to be used on mobile telephones and the like. The push to talk application provides a two-way radio having a bi-directional radio transceiver operating as a half-duplex channel in which only one unit transmits at a time, and any number of units can listen. Such a service allows a user of the mobile telephone to instantly reach users of other mobile telephones whilst eliminating the dialing and ringing steps that are required when making a regular cellular telephone call. Such operation is sometimes known as a "walkie-talkie" service.

In order to set up a PTT call, a user need only select the one or more contacts with which they wish to participate in a PTT call, and as long as those contacts are available, the user can hold down a PTT button on their mobile phone and speak into the microphone of their mobile phone. Initially, each participant in the PTT call can then hear the initial user who set up the call on their speaker. Once the user who set up the call has released their PTT button, any of the other participants in the PTT call can press their PTT button in order for their voice to be outputted by the speakers of the other participant's mobile telephones.

During a PTT call it is only possible for one participant in the call to transmit at any one time. When no one is transmitting, the first person to press their PTT key is allocated the right to transmit by the PTT system. Having the right to transmit is known as "having the floor".

In order to provide an indication to the PTT system and other users regarding whether a user of a push to talk application is available or not, a user selects and records a presence status associated with themselves from a predetermined list of presence status options. The recorded presence status of the user is displayed to other users of push to talk applications on their mobile telephones. This enables users of a push to talk application to view the presence status of their contacts before deciding whether or not they wish to attempt to set up a PTT call with them.

Furthermore, a push to talk application and/or a push to talk server associated with the application, can take a predetermined action based upon a contact's presence status when a user tries to set up a PTT call with that contact. For example, if a contact's presence status is recorded as "available", a push to talk call will be set up automatically. However, if the contact's presence status is recorded as "do not disturb", a push to talk call will be automatically rejected. It is also possible for a contact to have a presence status of "silent", in which case the contact will be prompted to provide an input as to whether or not they want to accept the push to talk call.

Instant messaging applications are also known, and two examples of which are MSN messenger and Yahoo messenger. These instant messaging applications allow users to send each other instant text messages over the Internet. These instant messaging applications also utilize availability of users of the application such that a person can determine the likelihood of a response when sending an instant message to one of their contacts. Examples of the availability of users that can be recorded can include: online, busy, and appear offline.

It will be appreciated that there are other application programs which store and utilize the presence availability status of the users of the programs, many of which have additional shortcomings in addition to those discussed above.

SUMMARY

Aspects and embodiments disclosed herein were devised with the foregoing in mind. For example, in a first aspect, a terminating device for a communications network comprises an application program configured to utilize availability status of a user; a communications interface configured to transmit data; and a presence engine configured to provide the communications interface with data representative of an availability status of a user and cause the communications interface to transmit the data directly to another terminating device.

In a second aspect, there is provided a terminating device for a communications network comprising an application program configured to utilize availability status of a user; a communications interface configured to receive data; and a presence engine configured to receive data representative of an availability status of a user directly from another terminating device and make available data representative of the received availability status of a user to the application program.

In a further aspect, there is provided a method of operating a terminating device for a communications network comprising obtaining data representative of an availability status of a user in relation to an application program configured to utilize availability status of a user; and sending the data representative of the availability status of the user directly to another terminating device.

In a further aspect, there is provided a method of operating a terminating device for a communications network comprising receiving data representative of an availability status of a user directly from another terminating device; and making available data representative of the received availability status of the user to an application program configured to utilize availability status of a user.

In a further aspect, there is provided a communications module configured to perform the method of an aspect. The communications module may be wireless, and may be configured for mobile (e.g., cellular) telephony. The communication module may be structured in hardware and/or software for operation within a mobile computing device. Examples of a mobile computing device include a personal digital assistant (PDA), a smart phone (e.g., a PDA type and/or an entertainment/media type), a laptop or sub notebook computer, or the like.

In a further aspect, there is provided a communications network comprising a plurality of terminating devices of an earlier aspect.

In a further aspect, there is provided a computer program comprising machine or computer-readable program elements for configuring a data processing apparatus or computing device to configure a terminating device of an earlier aspect and/or to implement a method of an earlier aspect, and/or to configure a wireless communications module of an earlier aspect, and/or to configure a communications network of an earlier aspect. In a further aspect, there may be provided a carrier medium carrying a computer program according to an earlier aspect.

The carrier medium may be one of the following: solid-state memory; magnetic memory; CD-ROM; digital versatile disk (DVD); read-write CD; an electronic signal; radio frequency carrier wave or optical carrier wave.

Embodiments herein may include advantages such as a reduction in computer and network resources when communicating availability status information between terminating devices, because processing of availability status by any devices intermediate the terminating devices can be avoided.

The presence engine may be configured to cause the communications interface to transmit the data representative of an availability status of a user in a generic format.

The presence engine may be configured to translate a signal representative of the availability status of a user in a format that is native to the application program into the data representative of an availability status of a user in the generic format.

The communications network may be a peer-to-peer network. The terminating device may comprise a mobile computing device. The presence engine may be configured to receive a signal representative of an availability status of a user in a generic format.

The presence engine may be configured to translate the signal representative of the availability status of a user in the generic format into data representative of the availability status of the user that is native to the application program, and make available the data representative of the received availability status in native format to the application program.

An application that utilizes availability status may be one that uses the availability status in any way, for example, when setting up a call to a user or initiating any other form of communication, when receiving a call from a user or any other form of communication, when receiving or transmitting any data. In some embodiments utilizing availability status may comprise displaying availability status to a user, and not necessarily using the availability status for any further functionality.

The terminating device may be a data processing apparatus, and the data processing apparatus may comprise one, or a plurality of, application programs.

Embodiments herein may include advantages such as a user having a single interface with regard to the availability status of themselves and other users. This can ensure that the availability status of a user is consistent across a number of application programs, and makes efficient use of computer and network resources. The presence engine, and the associated method, provides an improved user interface as the user can set and monitor availability status through a consistent interface.

The availability status of the user may be a communications availability status of the user for one or more application programs, and the availability status may define how any incoming communications requests to the user are processed. In some embodiments, the availability status may be used by non-communications application programs, for example calendar application programs, user profile application programs, and games application programs.

The received communications availability status data may be in a format that is native to an application program and/or native to the presence engine. The format that is native to the presence engine may be referred to as a "generic" format, which is not necessarily native to any application programs. Advantageously the received communications availability status data may be independent of any one application program.

The data processing apparatus may further comprise a user interface configured to receive user input indicative of the availability status of the user, and provide the presence engine with data representative of the availability status of the user. This enables a local user who is logged on to at least one application program on the data processing apparatus to record their availability status.

The data processing apparatus may further comprise a communications interface configured to receive data indicative of the availability status of a user and provide the presence engine with data representative of the availability status of the user. The user may be the user of the data processing apparatus itself, or a third party user, also referred to as a contact. This enables the data processing apparatus to be kept up-to-date with the availability status of remote users who are logged on to a different data processing apparatus. The communications interface may be a network interface, and this allows a user's data processing apparatus to be synchronized with other user's communications devices over the network.

The data processing apparatus may further comprise a first computer memory, and the presence engine may be configured to store the data representative of the availability status of the user in the first computer memory. The first computer memory may be configured such that the data representative of the availability status of the user stored in the first computer memory is accessible by more than one of the plurality of application programs.

Storing the data representative of the availability status of the user in computer memory allows the plurality of application programs to conveniently be able to access the data representative of the availability status of the user. Preferably, the data representative of the availability status of the user is stored centrally in computer memory, preferably at a single location such that computer memory is used efficiently. There may also be a reduced risk that a user will have contradictory availability statuses for different application programs.

The data processing apparatus further may comprise a second computer memory, and the presence engine may be further configured to store the one or more representations of the availability status in the second computer memory. The second computer memory may be configured such that the representations of the availability status stored in the second computer memory are accessible by more than one of the plurality of application programs. Storing the one or more representations in computer memory can provide advantages, for example, that the representations do not need to be regenerated each time they are needed by an application program as they are already stored in computer memory in the required format. The second computer memory may be the same memory device as the first computer memory. The first and second computer memories may be logically linked in computer memory.

The presence engine may be further configured to provide the one or more of the plurality of application programs with the representation of the availability status data that is suitable for that application program. The presence engine may be configured to determine which of the plurality of application programs have been recorded as requiring the availability status of the user; and provide those application programs that have been recorded as requiring the availability status of the user with the appropriate representation of the availability status data. The presence engine also may be configured to generate the one or more representations of the received availability status data by using a concordance stored in computer memory to look up the one or more representations that are suitable for the one or more of the plurality of application programs using the received availability status data.

Examples of advantages include application programs that are automatically informed each time an availability status changes. This may require that application programs that utilize availability status/presence information are standardized such that they can interact with a presence engine according to an embodiment of the invention. Standardization can include the application programs being reprogrammed, at least in part. For example, one or more modules within the application program may require amendment such that the application program can interact with a presence engine, preferably in a generic format that is not necessarily the same as the application program's native format.

The reprogrammed software in the application program may be provided as an interoperability layer that provides a bridge between the application program software that utilizes availability status/presence information and the presence engine. Such an interoperability layer may avoid the need for reprogramming of application software, other than providing for communication between the layer and the application.

At least two of the application programs may utilize different representations of the availability status. Embodiments of the invention may be used in a peer-to-peer communications environment, peer-to-server-to-peer communications environment, and peer-to-server-to-server-peer communications environment.

The plurality of application programs may comprise one or more of: a push to talk (PTT) application program, an instant messaging application program, a short message service (SMS) application program, a voice calling application program, an email application program, a video conferencing application program, a game, a contacts list, a phone book, a calendar, user preferences for the data processing apparatus, and optical-mechanical aspects of the data processing apparatus. The optical-mechanical aspects of the data processing apparatus may comprise the status of a ringer switch on the apparatus, a tactile status indicator, for example a vibration setting of the apparatus, a light on the apparatus, for example, an LED on the apparatus, etc.

The data processing apparatus may be a communications device, preferably a wireless/mobile communications device. The wireless communications device may be configured for cellular telephony, such as a mobile telephone. The data processing apparatus may be a computing device, preferably a mobile computing device such as a personal digital assistant (PDA), and may be a personal computer (PC) or a laptop. The communications device may be handheld.

The wireless communications module of an earlier aspect of the invention may be configured for cellular telephony. The communications core within the network of an earlier aspect of the invention may be a push to talk (PTT) server. In some embodiments, there may be provided a communications device configured to send and receive availability status information over a peer to peer communications channel/network. Preferably, such a network is configured to send and receive PTT communications availability status information between devices that are configured to provide PTT functionality.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

Specific embodiments will now be described, by way of example only, with reference to the drawings, in which.

Specific embodiments in accordance with the present invention will now be described, by way of example only, with reference to the drawings, in which.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
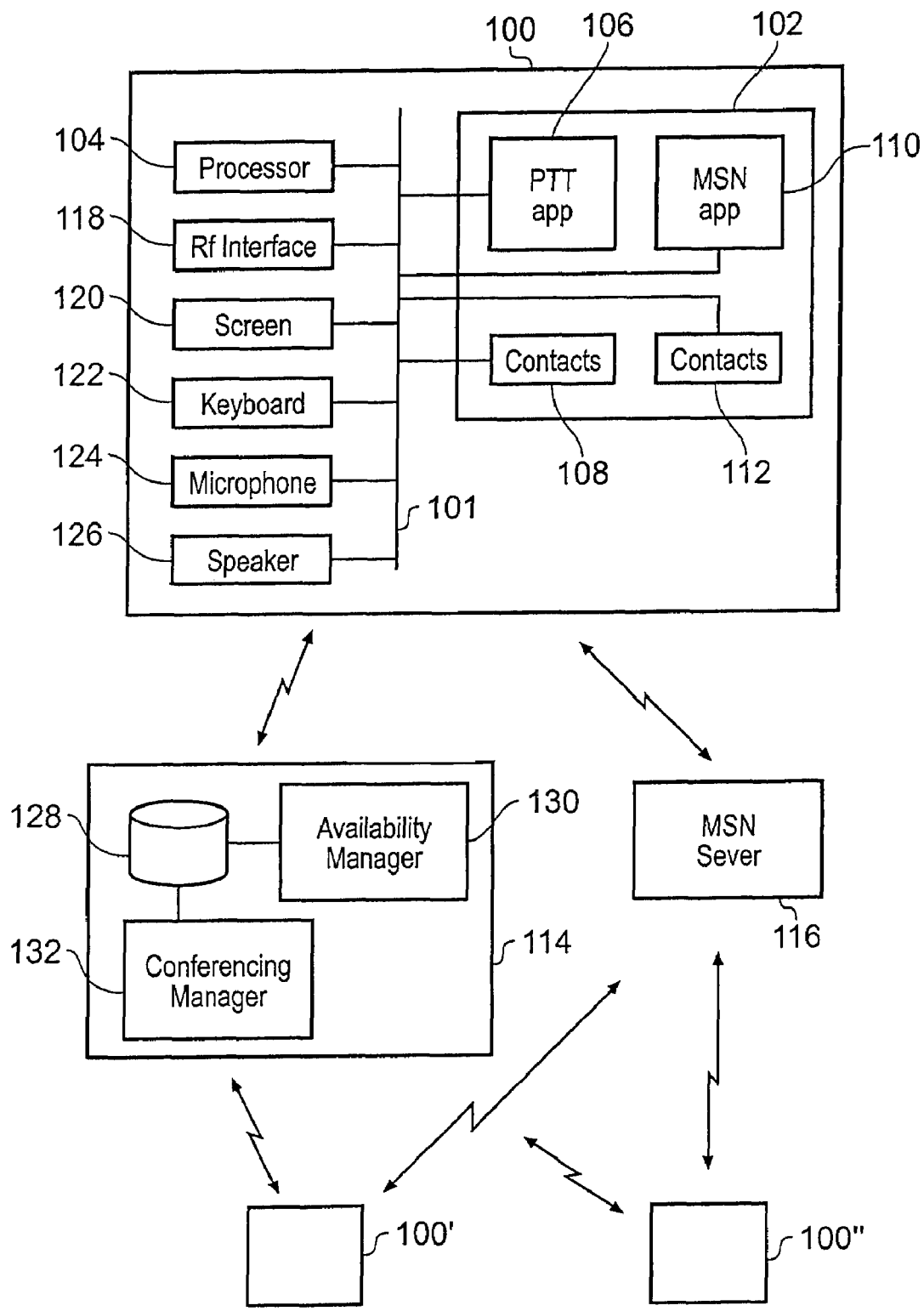
FIG. 1 illustrates an embodiment of a communications network.

FIG. 1 illustrates an embodiment of a communication network. Within the communication network are three communications devices 100, 100', 100", a push to talk (PTT) exchange server 114 and a conventional MSN Messenger instant messaging server 116. The PTT exchange server 114 is functionally and logically coupled to a communications network which may be a topological, cellular, PSTN, VOIP, or other suitable communications network. The MSN server 116 is coupled to the internet The communications device 100 comprises computer memory 102, a processor 104, an RF interface 118, a screen 120, a keyboard 122, a microphone 124, a speaker 126, and data bus 101. Stored in computer memory 102 is a prior art push to talk (PTT) application program/module 106 and its associated contacts database 108, as is a conventional MSN Messenger application program 110 and its associated contacts database 112. The PTT application 106 and the MSN application 110 are configured to be run on processor 104. The contacts databases 108 and 112 are configured to store the details of the contacts that are associated with each of the application programs 106 and 110.

The PTT exchange server 114 manages PTT users' availability and calls amongst one another. An example of the PTT exchange server is one made by Kodiak Networks of San Ramon, Calif. USA and was commissioned by Cingular Wireless. In addition, it is noted that an example of a PTT module 106 is one made by Palm, Inc. of Sunnyvale, Calif., USA and was also commissioned by Cingular Wireless. The PTT exchange server 114 comprises a subscriber database 128, an availability manager 130 and a conferencing manager 132. The subscriber database 128 contains information about each of the users/subscribers to the PTT service with the PTT exchange server 114 including the presence status that has been recorded for each user. The availability manager 130 and conferencing manager 132 are logical modules that are configured to manage the availability of each of the users that use a PTT application through the PTT exchange server 114 and set up the PTT calls respectively. The system provides PTT functionality between a number of communications devices 100 having PTT application modules 106 via the PTT exchange server 114.

When a user of the communications device 100 wants to communicate with another user through one of the application programs 106, 110, they do so by selecting the user(s) they want to contact from the appropriate contacts database 108, 112. The user who initiates a call is known as the so-called "originator", and the user that receives a call is known as the so-called "terminator". A list of potential terminators is provided as a so-called contacts list, and in this context a "contact" is a term given to a potential terminator.

The screen 120 on the communications device 100 is configured to expose/display a list of contacts information sorted by a contacts name. The user of the communications device 100 can select a contact by their name using the keyboard 122. Further details associated with the contact, for example, their telephone number, fax number, email address, postal address and any other data that may be stored in association with the contact is retrieved from the relevant contacts database 108, 112 and displayed on screen 120.

Push to talk application programs are known to utilize the so-called "presence" of a user. The "presence" is an indicator of availability that is stored in computer memory for a specific user of a PTT application program, and is used to provide calling options to a calling party that can potentially call the user.

A user of the push to talk application 106 can have one of three presence settings that are native to the PTT application. These settings include, for example, available; silent; and do not disturb. A user also logs in to the PTT application when they wish to use PTT functionality, and log out of the PTT application when PTT functionality is no longer required.

In one embodiment, after a user of the mobile communications device has logged in to the PTT application 106, the PTT application 106 causes three presence status options to be displayed on the screen 120. These are: available; silent; and do not disturb. Also, at any time whilst the user is logged on to the PTT application program, they can change their presence status by selecting the desired presence status from a drop down list of presence status options displayed on screen 120. The drop down list can be activated by a user selecting an icon associated with their presence status as currently stored in memory.

After the user has selected one of the displayed status options using the keyboard 122, the selected status of the user is stored in the contacts database 108 in computer memory 102. The selected presence status is also sent to the PTT exchange server 114 via the RF interface 118.

Following receipt of the selected presence status at the PTT exchange server 114, the availability manager 130 causes the subscriber database 128 to be updated with the PTT presence status of the user. In addition, the availability manager 130 sends data representative of the user's PTT presence to each of the contacts' devices 100', 100" that have the user in their list of contacts. The contact's devices 100', 100" will cause their locally stored PTT contacts lists to be updated with the new PTT presence status information of the user. Furthermore, the availability manager 130 in the PTT exchange server 110 sends a confirmation message to the user's communications device 100 confirming that the PTT presence status has been updated.

Similarly, when any one of the user's contacts updates their PTT presence status, the PTT exchange server 114 receives a message from that contact's communications device 100', 100", which causes the PTT exchange server 114 to send a message to the user's communications device 100 providing information about the change of PTT presence status for that one of the user's contacts. Following receipt of the change of PTT presence status message from the PTT exchange server 114, the PTT application 106 causes the PTT contacts database 108 to be updated accordingly.

When a user wishes to set up a PTT call, they select an appropriate icon with the keyboard 122. The user may open a dedicated PTT application program to set up a call and select one or more contacts from a list of contacts with whom they wish to set up a PTT call. Optionally, the user may access a call log and set up the call by selecting the contact with whom he wishes to call directly from the call log. In a further option, a user may set up a call by responding to an alert, for example, by responding to a prompt to "Call Tom" that is displayed to the user by a calendar application program. As can be seen, the user need not necessarily initiate a PTT call set up directly through the PTT application, and other forms of call initiation may be implemented in embodiments of the invention.

When the PTT application 106 receives an instruction that a PTT call is to be set up for a selected one or more contacts, the PTT application extracts the PTT contacts information corresponding to the selected one or more contacts from PTT contacts database 108 and generates a dial string. The dial string includes an identifier of the PTT exchange server 114 that will set up the PTT call, a caller identifier, and an identifier of the one or more contacts that the user wishes to contact. The PTT application 106 then sends the dial string to the PTT exchange server 114 via the RF interface 118 in the user's communications device 100. The user's communications device 100 is now an originating communications device.

Following receipt of the dial string, the conferencing manager 132 in the PTT exchange server 114 uses the identifier of each of the one or more contacts to look up the telephone numbers of the one or more contacts in the subscriber database 128. The conferencing manager 132 then generates a second dial string that includes an indicator that a PTT call is being requested, and an identifier of the user that is requesting the call. The PTT exchange server then sends the dial string to the telephone numbers of the one or more contacts—that is the terminating devices.

How a terminating communications device 100', 100" processes the incoming dial string from the PTT exchange server 114 depends upon their presence status as stored in computer memory of their terminating communications device 100', 100". The user of the terminating communications device will have already recorded their intended presence setting in computer memory as discussed above.

If the contact is recorded as "logged in and available" in the availability manager on the PTT server 114, the call is set up and routed to the called terminating communications device 100', 100". If the contact is recorded as "logged in and silent", the PTT application within the terminating communications device 100', 100" causes the user of the terminating communications device 100', 100" to be presented with an option as to whether or not they would like to accept the PTT call.

If the user of the terminating communications device provides an indication that they want to accept the PTT call, the PTT application sends a message to the PTT exchange server 114 that indicates that the call is accepted, and the call is set up. If the user of the terminating communications device 100', 100" provides an indication that they want to reject the call, the PTT application sends a message to the PTT exchange server 114 that indicates that the call is rejected, and the PTT call is not set up.

If the contact is recorded as "logged in and do not disturb" in the availability manager on the PTT server 114 automatically responds by rejecting the call. This is an automatic response, and occurs without any action or knowledge of the user of the called terminating communications device 100', 100". Optionally, a call log in the PTT server may record that a call was rejected.

In a PTT call, when one of the users of the devices are speaking they are said to "have the floor", and the PTT application allows only one user to have the floor at any one time. When nobody has the floor, a user can "take the floor" by pressing their "push to talk" button. If the floor is successfully gained, the user's communications device makes a "chirp" sound as confirmation and the user's speech is transmitted to the other communications devices. If the floor is not successfully gained, for example if another user has got there first, the user's communications device makes a "bong" sound and the user knows that they do not have the floor. If the user does not have the floor, their speech is not transmitted to the other communications devices.

The communications devices are effectively "walkie-talkie's" during PTT calls.

The MSN Messenger instant messaging application program 104 also utilizes a communications availability status of the user and the user's contacts, and allows instant text messages to be sent from a user to one or more recipients over the internet. The user's MSN Messaging contacts are stored in contacts database 208, along with their availability status, in a format that is native to the MSN application program 110.

Once a user has logged in to MSN Messenger, they can set their availability, for example, as one of the following: Online; Busy; Be Right Back; Away; In a Call; Out to Lunch; or Appear Offline. These availability statuses are native to the MSN application. The native format of the instant messaging availability status is not the same as the native format of the presence of the PTT presence status. In addition, the identifier for a contact is also different between PTT applications and MSN Messenger: the native format for identifying a contact in PTT applications is the telephone number of the contact, whereas the native format for identifying a contact in an MSN Messenger application is an email address.

A user of the MSN instant messaging application can type in a textual message and send it to any one of their contacts, independent of the contacts availability. The availability is used more as an indicator of whether or not the user can expect a reply. If the contact is offline, the message cannot be sent. If the contact is online, the message is displayed to the user.

The user of a communications device 100, 100', 100" can manage the way they communicate with their contacts using instant messaging by setting up their own instant messaging availability status, and viewing the instant messaging availability of their contacts.

Figure 2:
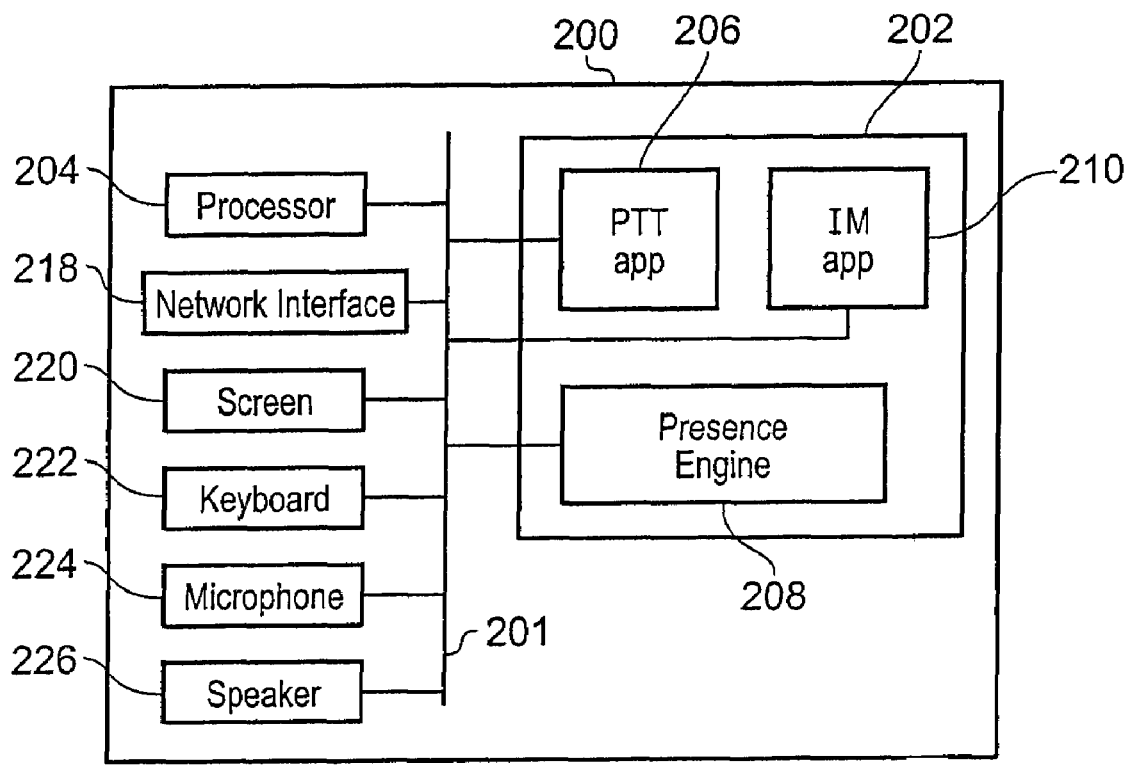
FIG. 2 illustrates an embodiment of a communications device.

FIG. 2 illustrates an embodiment of a communications device 200 which is a data processing apparatus. Communications device 200 comprises a computer memory 202, processor 204, network interface, 218, screen 220, keyboard 222, microphone 224, speaker 226, and data bus 201. A PTT application program 206 and an instant messaging application program 210 are stored in computer memory 202 and are configured to be run on processor 204. Communications device 200 also comprises a presence engine 208 which is stored in computer memory 202 and configured to be run on processor 204.

The presence engine 208 is an application programming interface (API) configured to receive data representative of the communications availability status/presence of a user, which may be the person who is using the communications device 200 or one of their contacts. The received data will be in a format that is native to an application program but is not necessarily in a format that is native to all application programs that are present on the communications device 200. The format of the received data may or may not be in a format that corresponds to the format of an application program that is already present on the communications device 200.

Following receipt of the data representative of the communications availability status, the presence engine 208 checks the format of the data and determines if the format is suitable for either or both of the PTT application program 206 and one or other of the application programs, for example, instant messenger application 210. If the presence engine 208 determines that the received communications availability status data is in a format that is native to the PTT application program 206, then the presence engine 208 generates a representation of the communications availability status data in the instant messaging format. Similarly, if the presence engine 208 determines that the received communications availability status data is in a format that is native to the instant messaging application program 210, then the presence engine generates a representation in the PTT format.

Alternatively, if the presence engine 208 determines that the received communications availability status data is in a format that is not native to either of the PTT application program and the instant messaging application program, then the presence engine generates two representations of the availability status of the user: one in the PTT format and the other in the instant messaging format.

The number of different representations generated by the presence engine 208 depends upon how many different formats of availability status are utilized by application programs within the communications device compared with the received representation of the communications availability status. It will be appreciated that instant messaging and push to talk (PTT) applications are described as illustrative and non-limiting examples of application programs.

Figure 3:
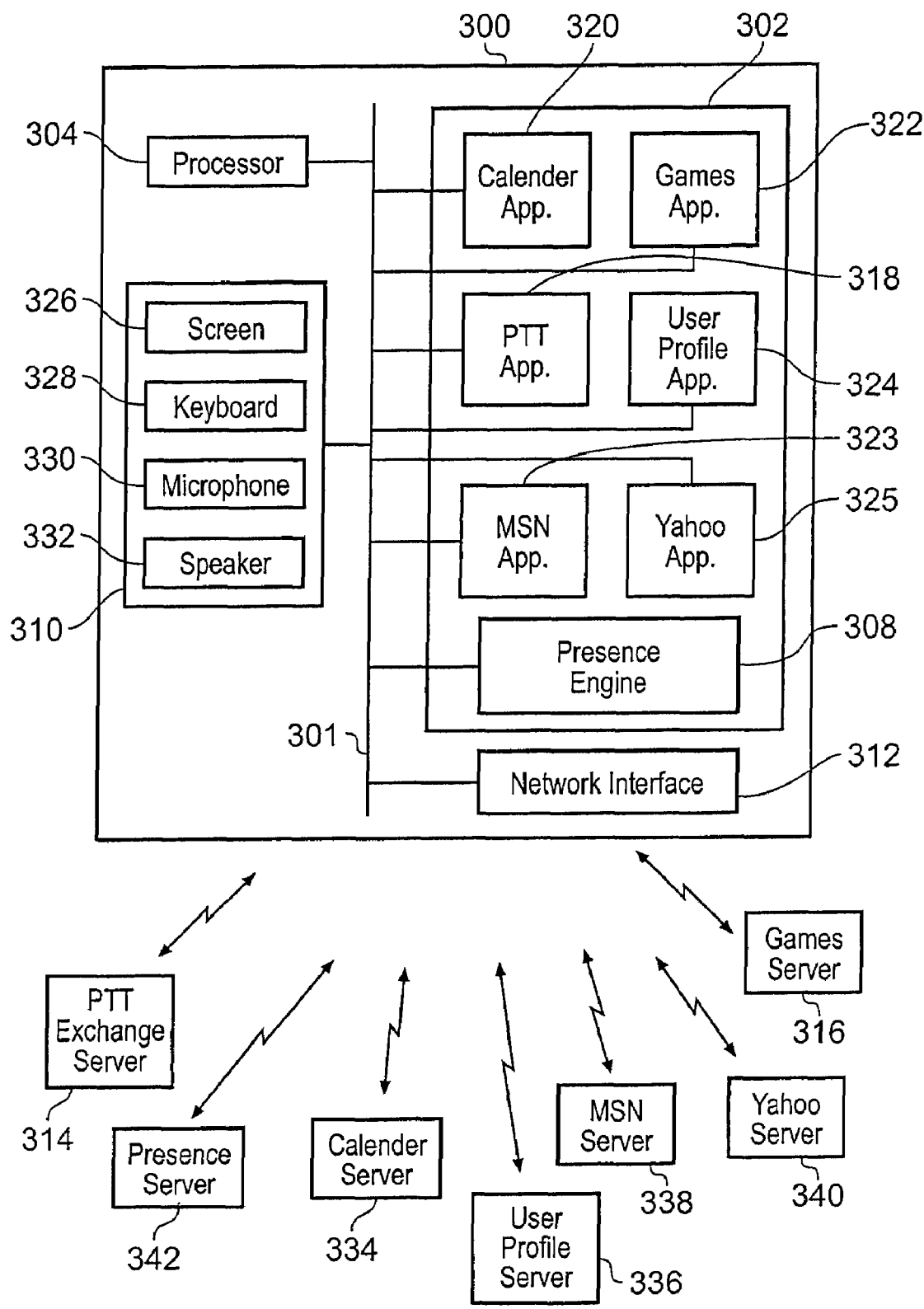
FIG. 3 illustrates another embodiment of a communications network.

FIG. 3 illustrates an embodiment of network that includes a mobile communications device 300, a PTT exchange server 314, a games server 316, a calendar server 334, a user profile server 336, an MSN instant messenger (IM) server 338, a Yahoo instant messenger (IM) server 340, and a generic presence server 342. The mobile communications device 300 comprises computer memory 302, processor 304, user interface 310, network interface 312 and data bus 301.

It is noted that FIG. 3 provides an illustrative example of a peer1 to server to peer2 communication. The network interface 312 provides access for the communications device 300 to a communication channel between the mobile communications device 300 and each of the PTT exchange server 314, games server 316, calendar server 320, user profile server 336, MSN instant messenger (IM) server 338, Yahoo instant messenger (IM) server 340, and a presence server 342. The presence server 342 may be a generic presence server that is configured to communicate availability status information between a number of different applications on a number of different data processing apparatus/communications devices, optionally in a generic format.

The user interface 310 in this embodiment comprises a touch (or inductive pen) sensitive screen 326, a keyboard/keypad 328, a microphone 330, and a speaker 332. The touch sensitive screen 326, keyboard/keypad 328, and microphone 330 are all configured to receive input from a user of the device 300. The touch sensitive screen 326 is configured to visually display information to the user, and the speaker 332 is configured to provide the user with audio information.

In this embodiment, the memory 302 has six application programs stored upon it—a PTT application program 318, a calendar application program 320, a games application program 322, a user profile application program 324, an MSN instant messaging (IM) application program 323, and a Yahoo instant messaging (IM) application 325. The PTT exchange server 314 is functionally similar to the PTT exchange server shown in FIG. 1 and previously described.

The MSN instant messaging server 338 is the same as that discussed in relation to FIG. 1. The Yahoo instant messaging server 340 is functionally similar to the MSN instant messaging server 338 but has its own user interface and utilizes different native availability statuses. The games server 316 enables the user to use the games application 322 to play multiplayer games with other users that are in communication with the games server 316 over a network. Depending upon the game, examples of availability statuses that may be utilized are "alive" and "dead".

In one embodiment, a presence server 342 is a server dedicated to processing availability status information. The presence server 342 comprises a database that is configured to store availability status information for each of the users that are registered with the presence server 342. The presence server 342 is configured to receive availability status information from a plurality of communications devices 300, store the availability status information in a database within computer memory, and provide the availability status information to other user's communications devices when instructed to do so by a user, and/or when a communications availability status changes.

The presence server 342 may provide the availability status information to each of the users registered with the presence server 342, or to a subset of the registered users. In one embodiment, the presence server 342 is not configured to set up a call or otherwise facilitate any communication between users of communications devices. In such embodiments, the presence server 342 is configured to only transfer availability status information of users. Alternatively, in other embodiments the presence server 342 may be configured, or configurable, to set up calls between users.

Calendar application programs are known, and examples of availability statuses that may be utilized by a calendar application program 320 are: "on holiday", "in the head office", "in a satellite office", "working from home", "ill", "unobtainable", etc. The calendar server 334 enables a user to monitor and optionally make entries in other users calendars using their communications device.

Availability statuses may be used by a user profile application program 324 to record how the communications device will react upon receipt of an incoming request, for example a call. The availability statuses may indicate optical mechanical aspects of the communications device 300 such as tactile status indication or an LED, and example statuses are "vibrate", "audio alarm", "illuminate", or any combination thereof. A user of a communications device can make a decision on how to interact with one of their contacts based upon the contact's user profile availability status.

When the user of the communications device 300 wants to set their availability status, they use the touch screen display 326 (or the keyboard 328 or the microphone 330) to indicate that they want to update their availability status. In the first instance, this may be by logging in to an application that utilizes presence such as described with reference to FIG. 2 above, or later by selecting an icon that is displayed on the screen 326 indicating they want to change their availability status. For example by selecting a drop-down menu that is provided next to the indicator of the current availability status.

When the presence engine 308 receives an indication that the user wants to set their availability status, the presence engine 308 displays on screen 326 a list of the potential availability statuses that the user can record himself as having. The list of potential availability statuses that are displayed are the availability statuses that are in a generic format and in this embodiment the generic format is the same as the format that is native to the PTT application program. However, it will be appreciated that the generic format may be equivalent to a format that is native to any other application program.

Optionally, the generic format may be not entirely native to one of the application programs, but instead a mixture of different native availability statuses in order that the displayed availability statuses can more accurately reflect the availability statuses for each application program. In further embodiments still, the generic format may not be native to any of the application programs.

When the user selects one of the potential availability statuses, a signal is sent from the touch screen display 326 or keyboard 328 to the presence engine 308 indicative of the selection. Following receipt of the signal indicative of the new availability status for a user, the presence engine 308 generates five representations of the new availability status—one suitable for each of the calendar application 320, the game application 322, the user profile application 324, the MSN instant messaging application 323, and the Yahoo instant messaging application 325—and makes these representations available to each of the respective applications in its native format. The new availability status is already in a format is native to PTT, and therefore a representation does not need to be generated by the presence engine 308 for the PTT application program 318.

The presence engine 308 also causes the network interface 312 to send data indicative of the new availability status to each of the PTT exchange server 314, the games server 316, the calendar server 334 the user profile server 336, the MSN instant messaging server 338, the Yahoo instant messaging server 340, and the presence server 342 in order that any subscriber databases that are stored on the servers 314, 316, 334, 336, 338, 340, 342 can be updated. Furthermore, the servers 314, 316, 334, 336, 338, 340, 342 also send signals representative of the new availability status of the user to each of the user's contacts for each of the application programs.

A list of application programs that utilize availability status for a user is stored in memory 302 on the communications device 300. The presence engine is configured to retrieve the application programs that utilize availability status from the memory 302 for a specific user, and send a signal representative of the new availability status of the user to each server associated with the application programs retrieved from memory 302.

In this embodiment, the presence engine 308 is configured to translate the new availability status into the required format for each of the servers. In other embodiments, the presence engine 308 is configured to cause the network interface 312 to send the signal representative of the new availability status to each of the servers in the generic format, and the servers are configured to translate the new availability status from generic format into their native format.

When one of the user's contacts changes their availability status, the user's communications device 300 will receive a signal indicative of that change from one or more of the servers. The network interface 312 provides the presence engine 308 with the received signal representative of the new availability status of the contact, and the presence engine 308 generates the necessary representations of the availability status that are required in order for the presence engine to make available a representation of the availability status to each of the applications 318, 320, 322, 323, 324, 325 in its native format.

In other embodiments the availability status is exposed to the application programs 318, 320, 322, 323, 324, 325 in the generic format and the application programs are configured to translate the availability status from generic format into their native format. It is noted that in one embodiment, the PTT exchange server 314, MSN server 338, and Yahoo server 340 may be referred to as so-called "communications cores". A communications core provides at least a part of the communication functionality for the communications device. In addition, it will be appreciated that in other embodiments there may be one or more of the same types of application program within the same data processing apparatus/communications device. For example, there may be more than one instant messaging application (as in FIG. 3), more than one games application, etc.

Figure 3A:
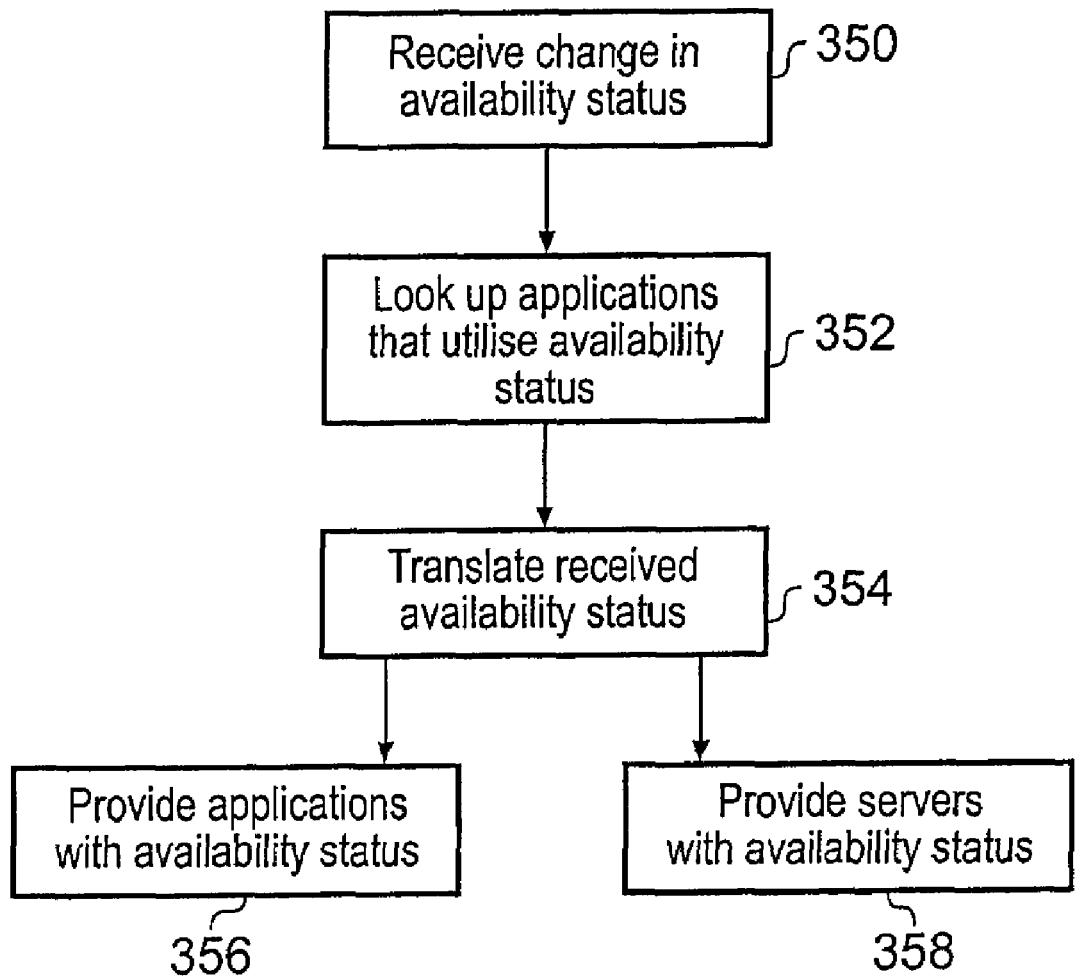
FIG. 3a illustrates a process flow control diagram showing an embodiment of steps performed for operation of a communications device.

Referring now to FIG. 3a, it illustrates a process flow control diagram showing one embodiment of steps performed when operating a communications device 300. Referring first to step 350, the presence engine 308 receives a signal indicative of a change in availability status of a user. The signal may be indicative of a change in availability status of a user that is logged in to one or more application programs on the communications device 300, or maybe indicative of a third-party user who is recorded as a contact for a user who is logged on to the communications device 300.

Next, at step 352, the presence engine 308 retrieves from memory 302 a list of application programs that utilize availability status for the user whose availability status has changed. At step 354, the presence engine 308 translates the received signal into one or more signals indicative of the change in availability status in a format that is native to each of the application programs that were retrieved at step 352.

At step 356, the presence engine 308 provides each one of the list of application programs that were retrieved from memory 302 as utilizing availability status for the user, with the signal indicative of the change in availability status in the format that is native to that application program. Similarly, the presence engine 308 provides each server associated with the application programs with the signal indicative of the change in availability status in its native format at step 358.

Figure 4:
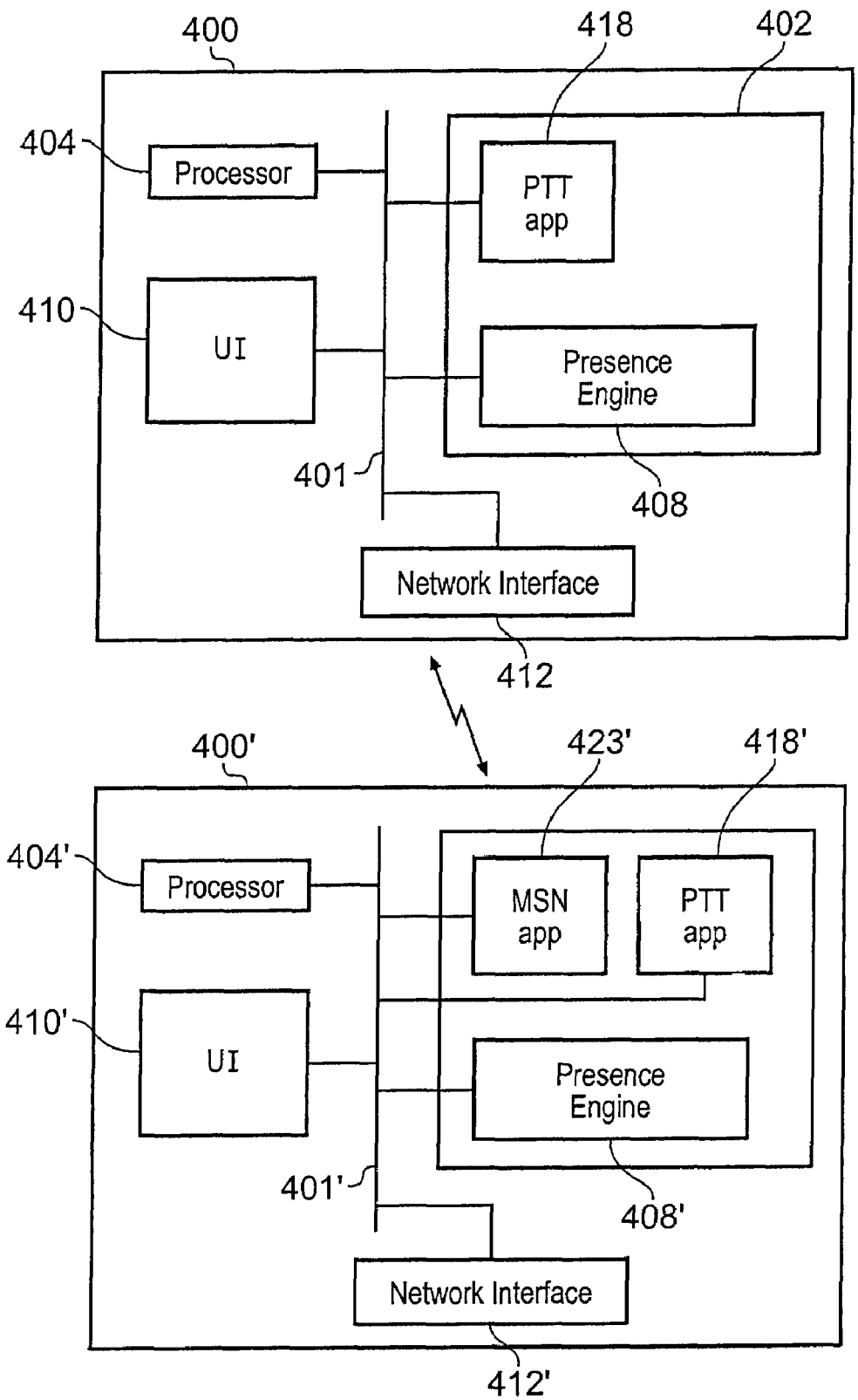
FIG. 4 illustrates another embodiment of a communications network.

FIG. 4 illustrates an embodiment of two communications devices 400, 400'. The first communications device 400 comprises memory 402, processor 404, user interface 410, network interface 412, and data bus 401. Similarly, the second communications device 400' comprises memory 402', processor 404', user interface 410', network interface 412', and data bus 401'.

A PTT application program 418 and presence engine 408 are stored in memory 402 of the first communication device 400, and a PTT application program 418', MSN application program 423' and presence engine 408' are stored in memory 402' of the second communication device 400'. In this embodiment, the first and second communications devices 400, 400' are configured to communicate directly with each other, not via a server/communications core. This is known as peer to peer communications. More specifically, the network interfaces 412, 412' are configured to send and receive data directly to and from network interfaces 412, 412' of other communications devices.

When a user of communications device 400 provides an input to the user interface 410 indicating that their communications availability status has changed, the presence engine 408 is configured to generate a representation of the change in communications availability status in a generic format and provide the network interface 412 with details of the change in communications availability status in generic format. The generic format is one that is recognized and stored by the presence engine. Generating the representation of the change in communications availability status involves translating the representation from a format that is native to PTT application 418 into the generic format, if the native format is not the same as the generic format. In this embodiment, the generic format is the same as the native PTT format and therefore a translation is not required.

The network interface 412 then transmits a signal representative of the change in communications availability status in the generic format directly to each communications device that is listed as a contact for the user of first communications device 400. In this embodiment, the user of second communications device 400' is listed as a contact for the user of the first communications device 400, and therefore network interface 412 of the first communications device 400 transmits details of the change in communications availability status in generic format directly to the network interface 412' of the second communications device 400'.

Following receipt of a signal representative of a change in communications availability status in generic format from the first communications device 400, the presence engine 408' in the second communications device 400' automatically generates representations of the change in communications availability status in formats that are native for each of the application programs that utilize communications availability status stored in memory 402'. In this example, the generic format for communications availability status is native to the PTT application program 423', and therefore only a representation of the change in availability status in a format that is native to the MSN application program 418' is required to be generated.

Figure 4A:
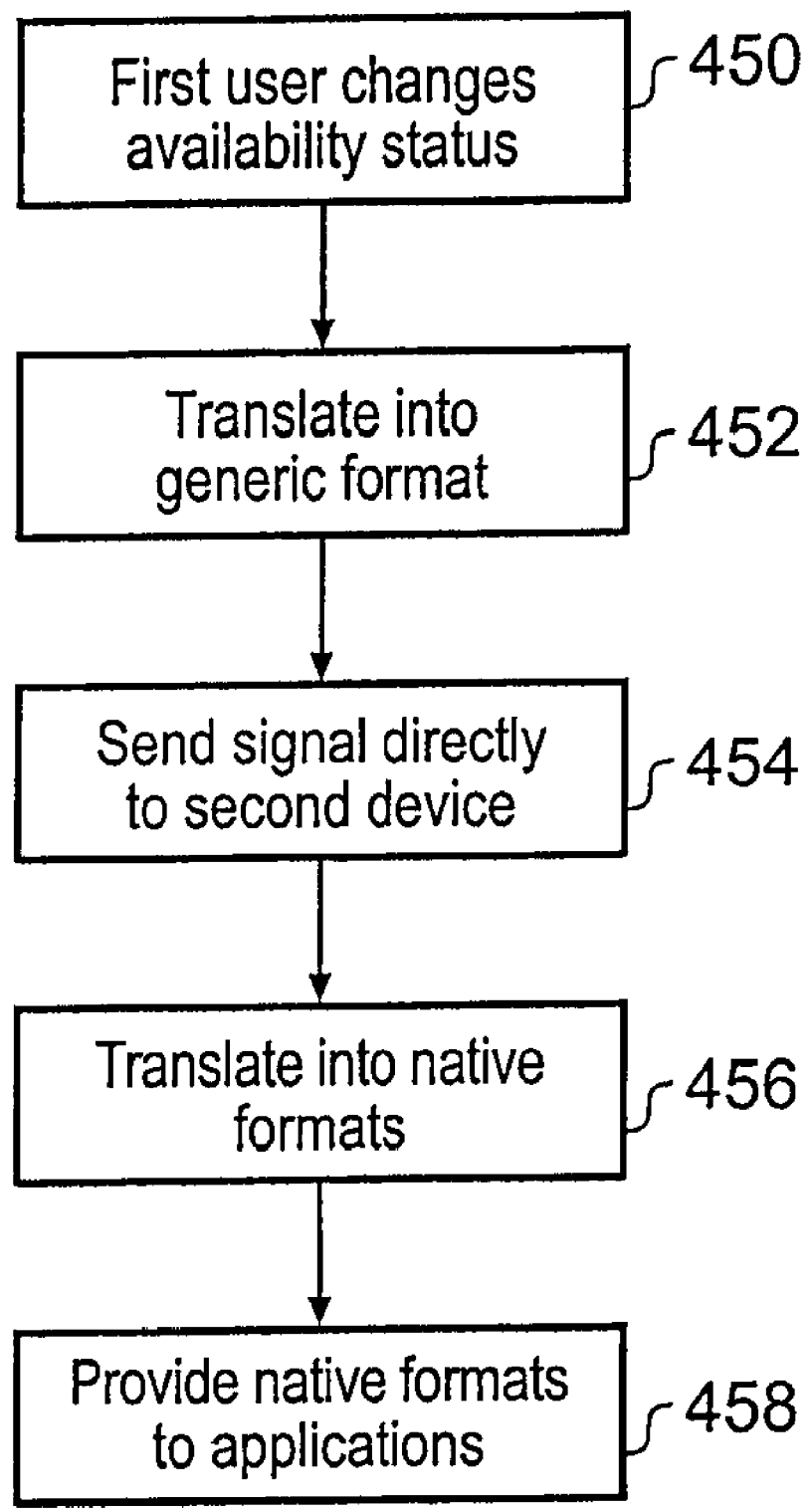
FIG. 4a illustrates a process flow control diagram showing an embodiment of steps performed when operating a communications device.

FIG. 4a illustrates a process flow control diagram showing an embodiment of steps performed when operating a communications device. At step 454, a user of a first communications device 400 selects an icon using a user interface 410 to indicate that they wish to change their availability status, and also selects the new availability status that they would like to record for themselves. The user interface 410 generates a signal indicative of the new availability status, and provides the signal to a presence engine 408 associated with the first communications device 400. The signal provides availability status information in a format that is native to one or more application programs associated with the first communications device 400.

The presence engine 408 associated with the first communications device 400 translates the signal indicative of availability status in native format into a signal indicative of availability status in a "generic" format at step 452. The generic format is independent of any application programs that may be associated with the first communications device 400.

At step 454, the presence engine 408 sends the signal indicative of availability status in generic format to a second communications/peer device 400'. More specifically, the presence engine 408 causes a network interface 412 associated with the first communications device 400 to transmit the signal to a network interface 412' associated with the second communications device 400'.

Following receipt of the signal at the second communications device 400', at step 456 a presence engine 408' translates the received signal into signals indicative of availability status that are native to any application programs that utilize availability status that are stored on the second communications device 400'. The native format signals indicative of the availability status are provided to the application programs in the second communications device 400' at step 458.

In other embodiments, a change in PTT communications availability status may be communicated directly between the first and second communications devices 400, 400' in a format that is native to the PTT application programs 418, 418'. In such an embodiment, the presence engine within the receiving communications device presents the PTT application program with the change in communications availability status in its native format. The presence engine may, or may not, be configured to also translate the change in communications availability status for any application programs where necessary. For example, if the second communications device 400' were to receive a signal indicative of the change in communications availability status of the first communications device 400 in native PTT format, the presence engine 408' may, or may not, be configured to translate the received communications availability status into a format that is native to the MSN application 423'. In some embodiments, they may be provided a communications device configured to send and receive availability status information over a peer to peer communications channel/network. Preferably, configured to send and receive PTT communications availability status information between devices that are configured to provide PTT functionality.

Figure 5:
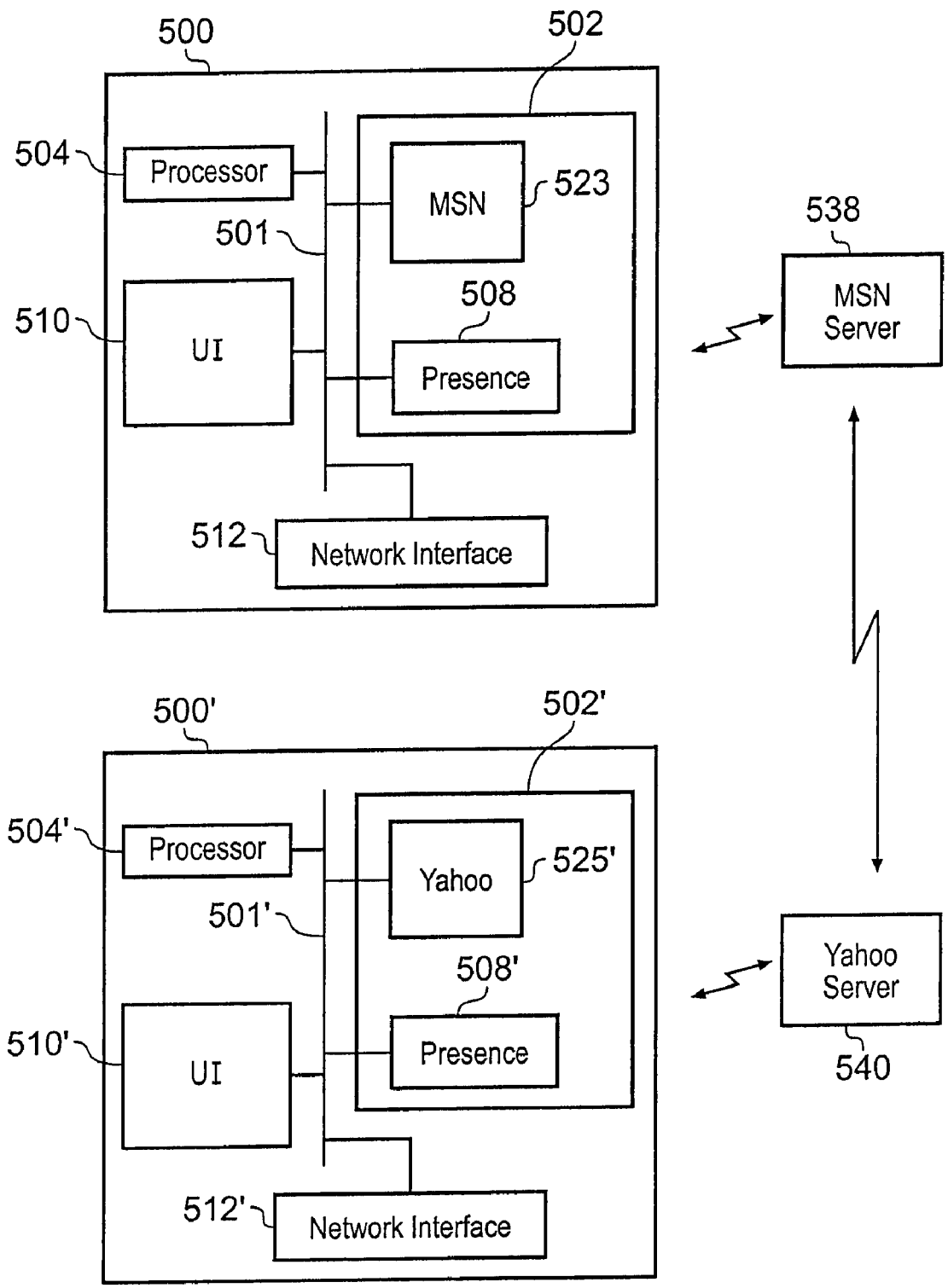
FIG. 5 illustrates still another embodiment of a communications network.

FIG. 5 illustrates an embodiment of a network that includes a first communications device 500, a second communications device 500', and two communication cores: an MSN server 538, and a Yahoo server 540. It is noted that FIG. 5 provides an illustrative example of peer1 to server1 to server2 to peer2 communications.

In this embodiment, first and second communications devices 500, 500' each comprise a processor 504, 504', memory 502, 502', user interface 510, 510', network interface 512, 512', and data bus 501, 501'. An MSN application program 523 and presence engine 508 are stored on memory 502 in the first communications device 500, and a Yahoo application program 525' and presence engine 508' are stored on memory 502' in the second communications device 500'. The MSN application program 523, Yahoo application program 525' and presence engine 508, 508' are all as discussed above.

Further in this embodiment, communications availability status information is communicated between the first communications device 500 and the second communications device 500' via both the MSN server 538 and the Yahoo server 540. It will be appreciated that it is not possible for users of the communications devices 500, 500' to communicate directly with each other by instant messaging as they are both using different, incompatible, application programs. Nonetheless it is still possible for communications availability status information to be shared between the two communications devices 500, 500' as discussed below.

When a first user of the first communications device 500 changes their communications availability status, the presence engine 508 is configured to generate and store a representation of the change in communications availability status in a generic format, which in this example is a format that is native to a PTT application. The presence engine 508 then provides the network interface 512 with the representation of the change in communications availability status in the generic format such that the network interface 512 can transmit the signal representative of the change in communications availability status to MSN server 538.

Following receipt of the signal from the first communications device 500, the MSN server 538 translates the signal representative of the change in communications availability status in generic format into a format that is native to the MSN server 538. The MSN server 538 can then store the communications availability status in its native format in a database within the MSN server 538, and also communicate the change in communications availability status (either in generic or native format) to other communications devices that have the user whose communications availability status has changed stored in their MSN contacts list. The identity of the users to which the change in communications availability status should be sent is determined from contacts lists associated with each of the users that are stored in memory on MSN server 538.

Furthermore, the MSN server 538 is configured to transmit a signal representative of the change in communications availability status in generic format to the Yahoo server 540, and any other servers whose identity is stored in memory within the MSN server 538. Reciprocal agreements between communications core providers to share communications availability status may be put in place, and identifiers of such reciprocating communications core providers may be stored in memory associated with the communications core.

Following receipt of the signal representative of the communications availability status from the MSN server 538, the Yahoo server 540 is configured to translate the received representation of the communications availability status into its native format, and store the native communications availability status in memory. In addition, the Yahoo server 540 transmits a signal representative of the change in communications availability status in generic format to communications devices that have the user whose communications availability status has changed stored in their Yahoo contacts list, which in this embodiment includes second communications device 500'.

When the network interface 512' of second communications device 500' receives a signal representative of a change in communications availability status from the Yahoo server 540, a signal is sent to the presence engine 508', whereby the communications availability status is translated from generic format into a format that is native to the Yahoo application program 525'. The translated communications availability status is provided to the Yahoo application program 525' such that the contacts list within the second communications device 500' is updated with the new communications availability status of the user of the first communications device 500.

It is noted that the described embodiment allows non-common server subscribers to share presence information. That is, a subscriber to the MSN server 538 (the user of communications device 500), shares presence information with a subscriber to the Yahoo server 540 (the user of the second communications device 500'). Further, it is noted that in other embodiments there may be more than two communication cores/servers between two end communications devices/peers.

Figure 6:
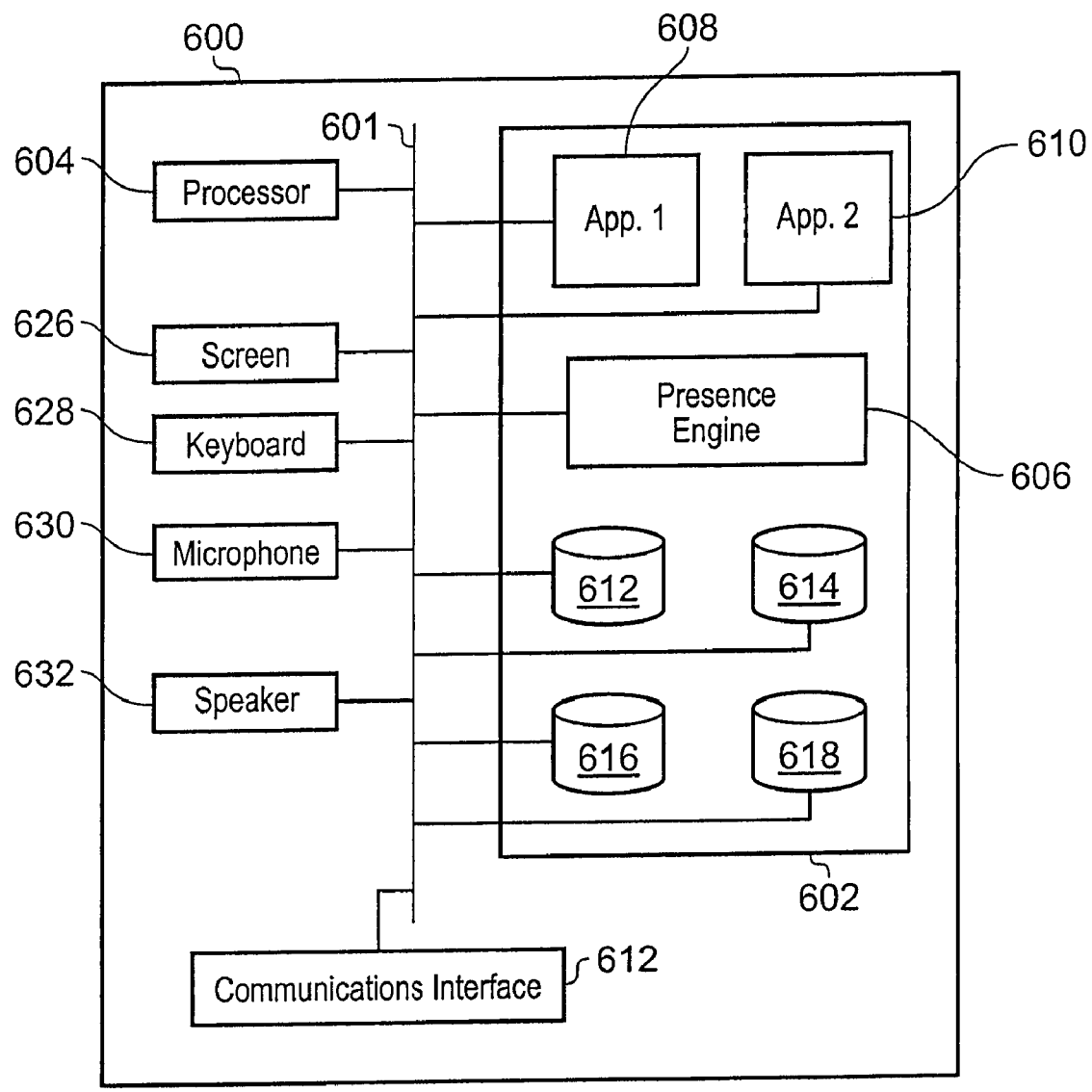
FIG. 6 illustrates yet another embodiment of a communications device.

FIG. 6 illustrates an embodiment of a mobile telephone 600, which is a communications device. The mobile telephone comprises computer memory 602, processor 604, touch sensitive display screen 626, keyboard 628, microphone 630, speaker 632, communications interface 612 and data bus 601. Stored in computer memory 602 are a first application program 608, a second application program 610 and presence engine 606. The presence engine 608 can access data stored in user availability status database 612, contacts database 614, availability concordance database 616 and applications database 618, all of which are stored in computer memory 602.

The user availability status database 612 stores a concordance between a user and their availability status, and an example of the data contained within user availability status database is shown below:

| Unique user identifier | Generic availability status |
|---|---|
| 0368451265 | D |
| 0319781436 | B |
| 0432853216 | C |

In this embodiment, the generic availability status is in a format that is equivalent to a format that is native to a PTT application (discussed in more detail below) and the unique user identifier is a telephone number associated with a user. Therefore, the unique user identifier is globally unique to that user.

In other embodiments, the same user identifier is used in different communications devices to represent different users: that is, the formats of the unique user identifier and/or the generic availability statuses are unique only within the presence engine 606. For example, users may be allocated an internal user identifier as a number in the sequence: 01, 02, 03, etc., and it does not matter that the internal unique identifiers are unique only within the communications device 600, as the instance of the unique identifier will always be translated into a format that is native to a specific application, or translated into a generic format before being sent from the communications device.

As discussed in relation to FIGS. 2, 3, 4 and 5, the presence engine 608 is configured to receive data about an update of the availability status of a user. The presence engine 608 receives this data in a format that is native to an application program or in a generic format. When the presence engine receives information about the change in the availability status of a user, the presence engine 606 looks up the unique user identifier in the contacts database 614 in order to translate the received user identifier into the unique user identifier. An example of the data stored within contacts database 614 is shown below:

| Unique User Identifier | Name | Telephone Number | Email address | MSN Messenger Login |
|---|---|---|---|---|
| 0368451265 | David Smith | 0368451265 | ds@palm.com | davids@hotmail.com |
| 0319781436 | Jane Edwards | 0319781436 | je@palm.com | janee@hotmail.com |
| 0432853216 | Tom Jones | 0432853216 | tj@palm.com | — |

If the presence engine 606 receives an update of status from an MSN Messenger server, the user whose availability status has changed is identified by their email address. In this case the presence engine 606 looks up the unique user identifier in the contacts database using the received email address.

Similarly, if the presence engine 606 receives an update of status from a PTT server, the user whose availability status has changed is identified by their telephone number. In this case the presence engine will look up the unique user identifier from the contacts database using the received telephone number, and the unique identifier will be the same as the telephone number.

The user of the communications device 600 is unaware of the underlying unique user identifier, as it is used solely for internal operations within the communications device 600. The user will continue to select which contacts they wish to interact with from a display of contacts names on the display screen 626.

The presence engine 606 also uses the availability concordance database 616 to translate the received availability status into the generic format of user availability that is required for the user availability status database. An example of data stored within availability concordance database 616 is shown below:

| Generic availability status | PTT presence | Messenger availability | Games availability |
|---|---|---|---|
| A | Logged in and available | Online | Alive |
| B | Logged in and do not disturb | Busy | Dead |
| C | Logged in and silent | Be right back | Alive |
| C | Logged in and silent | Away | Alive |
| B | Logged in and do not disturb | In a call | Dead |
| B | Logged in and do not disturb | Out to lunch | Dead |
| C | Logged in and silent | Appear offline | Alive |
| D | Logged out | Offline | Dead |

In this example, the generic availability status format is directly linked to the representation of the PTT presence status. That is, "A" is equivalent to "Logged in and available", "B" is equivalent to "Logged in and do not disturb", "C" is equivalent to "Logged in and silent", and "D" is equivalent to "Logged out". In some embodiments, the availability concordance database may be customized by a user. For example, the user may specify whether they would like generic availability status "C" (which is equivalent to "Logged in and silent") to be classed or classified as "dead" or "alive" for gaming applications.

In addition, when a generic availability status is recorded as "B" for example, this could relate to "Busy", "In a call" or "Out to lunch" in the messenger availability format. When the generic availability status is changed to "B", the presence engine (e.g., 606) is adapted to determine which of the corresponding messenger availability statuses to use. This may be based upon a user's preferences or any other rule that is stored in computer memory. In other embodiments, the messenger application program may be provided with an interoperability layer that is configured to determine which of the native messenger availability status as to use for a corresponding availability status in generic format.

The applications database 618 is used for recording which application programs require availability status for which users/contacts. For example, different contacts may have different application programs and therefore the contacts list for each of the application programs may be different. An example of data stored within the applications database 618 is shown below:

| Unique user identifier | First application 608 requires availability? | Second application 610 requires availability? |
|---|---|---|
| 0368451265 | YES | YES |
| 0319781436 | YES | NO |
| 0432853216 | NO | YES |

When the presence engine 606 receives information about a change of availability status of a user, the presence engine 606 then looks up which, if any, application programs require information about the availability status of the user. The presence engine 606 can generate as many representations of the updated availability status of the user as are required in order to make the updated availability status available in native format to each of the application programs that require the availability status of the user.

As an example, if the presence engine 606 receives a message from a PTT server that the new status for user "je@palm.com" is "Online", the presence engine 606 will look up user "je@palm.com" in contacts database 614 and determine that the user in question has unique user identifier "0313781436". The presence engine 606 will also look up status "Online" in availability concordance database 616 and determine that the generic availability status is "A". Having made the above two determinations, the presence engine then writes the new status information to user availability database 612 to show that user "0313781436" now has availability status "A".

Also, having made the determination of the updated availability status of the user, the presence engine 606 then looks up user "0313781436" in applications database 618, and determines that only the first application 608 has been recorded as requiring the availability status information for user "0313781436". The presence engine continues to generate a representation of the availability status of user "0313781436" that is in a format that is native to the first application 608 as determined from the availability concordance database 616. The presence engine 606 then sends the representation in the format that is native to the first application program to the first application program 608.

Preferably, when the user receives an update of availability status from a local user interface, the format of the availability status and the user identifier will already be in the generic availability status format and the unique user identifier format that are used in availability status database 612. Therefore it will not be necessary to translate the received availability status into the generic availability status using availability concordance database 616 and contacts database 614 before storing the update in the availability status database 612.

It will be appreciated that one or more of the user availability status database 612, contacts database 614, availability concordance database 616 and applications database 618 may not be required in all embodiments of the invention. This may depend upon the format of the received data, whether or not the optional feature that the application programs can be recorded as requiring availability status is present, and how the data is stored in computer memory. In some embodiments, the user availability database may store all of the representations in each of the different formats for each of the users.

In embodiments where communications availability status is communicated between devices in a generic format (as in FIG. 5), the contacts database 614 and availability concordance database 616 will not be required to translate the incoming signal representing communications availability status in order to store the communications availability status in user availability status database 612. The incoming signal will already provide the unique user identifier and generic availability status in the format that is required for user availability status database 612.

Figure 7:
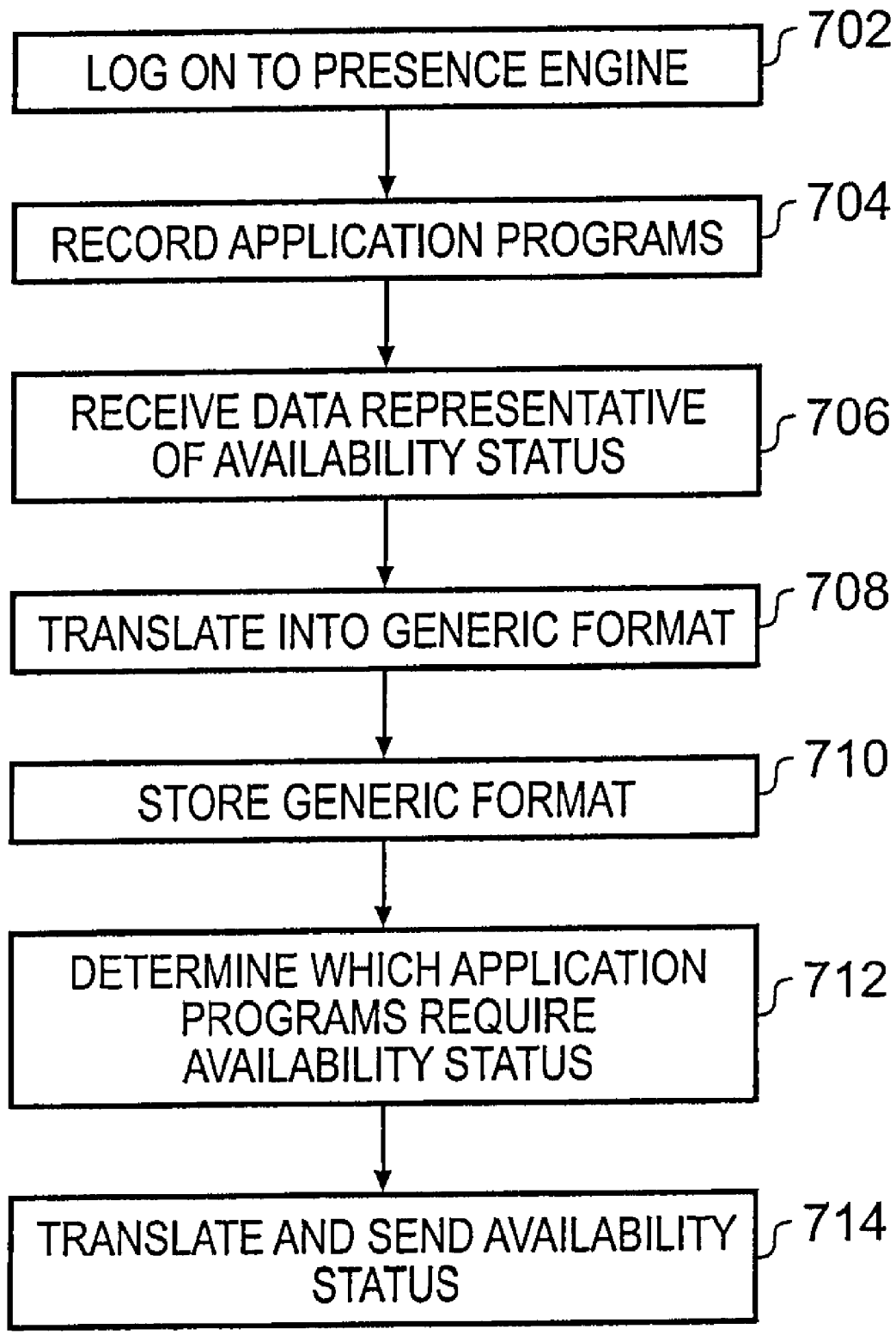
FIG. 7 illustrates a process flow control diagram showing an embodiment of steps performed when operating a communications device.

FIG. 7 illustrates a process flow control diagram showing one embodiment of steps performed when operating a mobile communications device 600. Referring first to step 702, a user logs on to a presence engine 606 on a communications device 600. This may happen automatically when a user first switches on the communications device 600, or may occur automatically when the user first tries to use an application program 608, 610 that utilizes availability status of a user. Alternatively, the user may have to actively open a specific presence engine application in order to log on to the presence engine 606.

Application programs 608, 610 that require availability status information of a user are recorded in applications database 618 in computer memory 602 at step 704. The application program's 608, 610 requirement for availability status may be recorded when that application 608, 610 is opened by a user. Alternatively, or additionally, if the user logs on to the presence engine 606 after one or more applications 608, 610 have already been opened, the presence engine 606 may monitor a list of the applications that are running to determine whether or not they utilize availability status information. If the presence engine 606 determines that any applications 608, 610 are running that do utilize availability status information, it automatically records in the applications database 618 in computer memory 602 those application programs 608, 610 that require the availability status of all of its associated contacts at step 704.

Referring next to step 706, the presence engine 606 receives data representative of availability status of a user. As discussed above, the data may be received from a user interface 626, 628, 630 on the communications device 600 and relate to the local user who has logged on to the communications device 600, or the indication may be received from a communications interface 612 and relate to a remote user who is listed as being one of the local user's contacts. At step 708, the received data representative of availability status is translated into a representation of the availability status in a generic format, and the generic format representation of the availability status is stored in a user availability user availability database 612 in computer memory 602 at step 710.

At step 712, the presence engine 606 determines which, if any, application programs 608, 610 require availability status information and the format of the representations of the availability status that are required for those applications 608, 610. At step 714, translations of the generic format representation into each of the determined format of representations are generated, and the representations are automatically sent by the presence engine 606 to the applications 608, 610 that have been determined at step 712.

Figure 8:
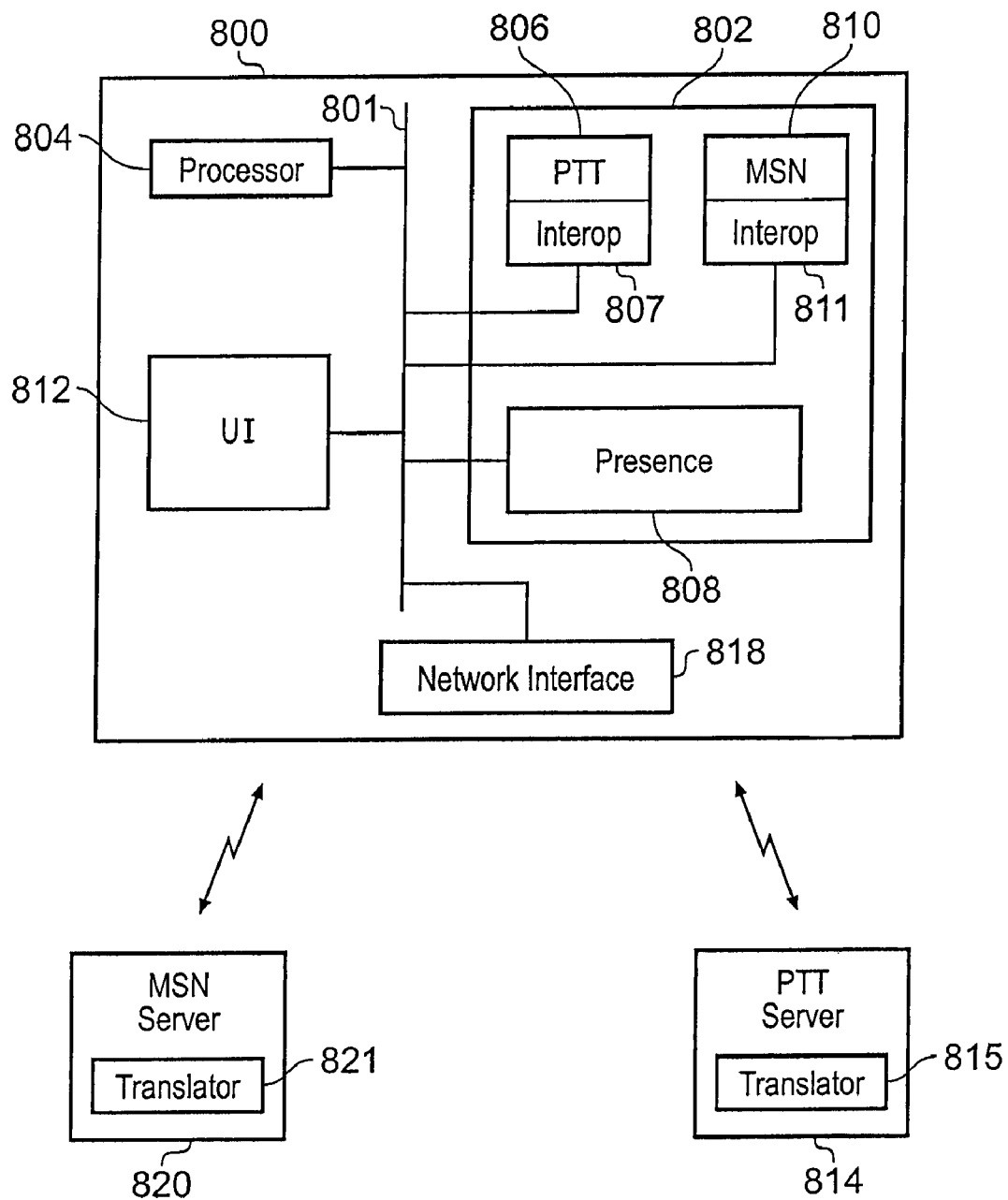
FIG. 8 illustrates yet another embodiment of a communications network.

FIG. 8 illustrates yet another embodiment of a network. This embodiment of the network includes a communications device 800, an MSN server 820, and a PTT server 814. Communications device 800 comprises a processor 804, a user interface 812, computer memory 802, network interface 818, and data bus 801. MSN server 820 includes a translation module 821, and PTT server 814 also includes a translation module 815.

The PTT application program 806 includes an interoperability layer 807 that is configured to translate any incoming communications availability status data from a generic format into the format that is native for the PTT application program 806. Similarly, the MSN application program 810 includes an interoperability layer 811 that is configured to translate any incoming communications availability status data from a generic format into the format that is needed for the MSN application program 810. It will be appreciated that the term "interoperability layer" describes a logical interface between the application program software and the outside world.

The presence engine 808 is configured to receive a signal indicative of the change in communications availability status of a user in a generic format. The presence engine is configured to receive signals indicative of the change in communications availability status from the user interface 812 via the PTT application program 806, via the MSN application program 810, and is also configured to receive signals indicative of the change in communications availability status from the network interface 818.

In this embodiment, the presence engine 808 is configured to process communications availability statuses in the generic format. It is the responsibility of the application programs 806, 810 and the application servers 820, 814 to translate the communications availability status from its native format into the generic format when sending communications availability status information and translating from generic format to native format when receiving communications availability status. This functionality is provided by the interoperability layers 807, 811 in the application programs 806, 810 and the translation modules 821, 815 in the servers 820, 814.

Figure 9:
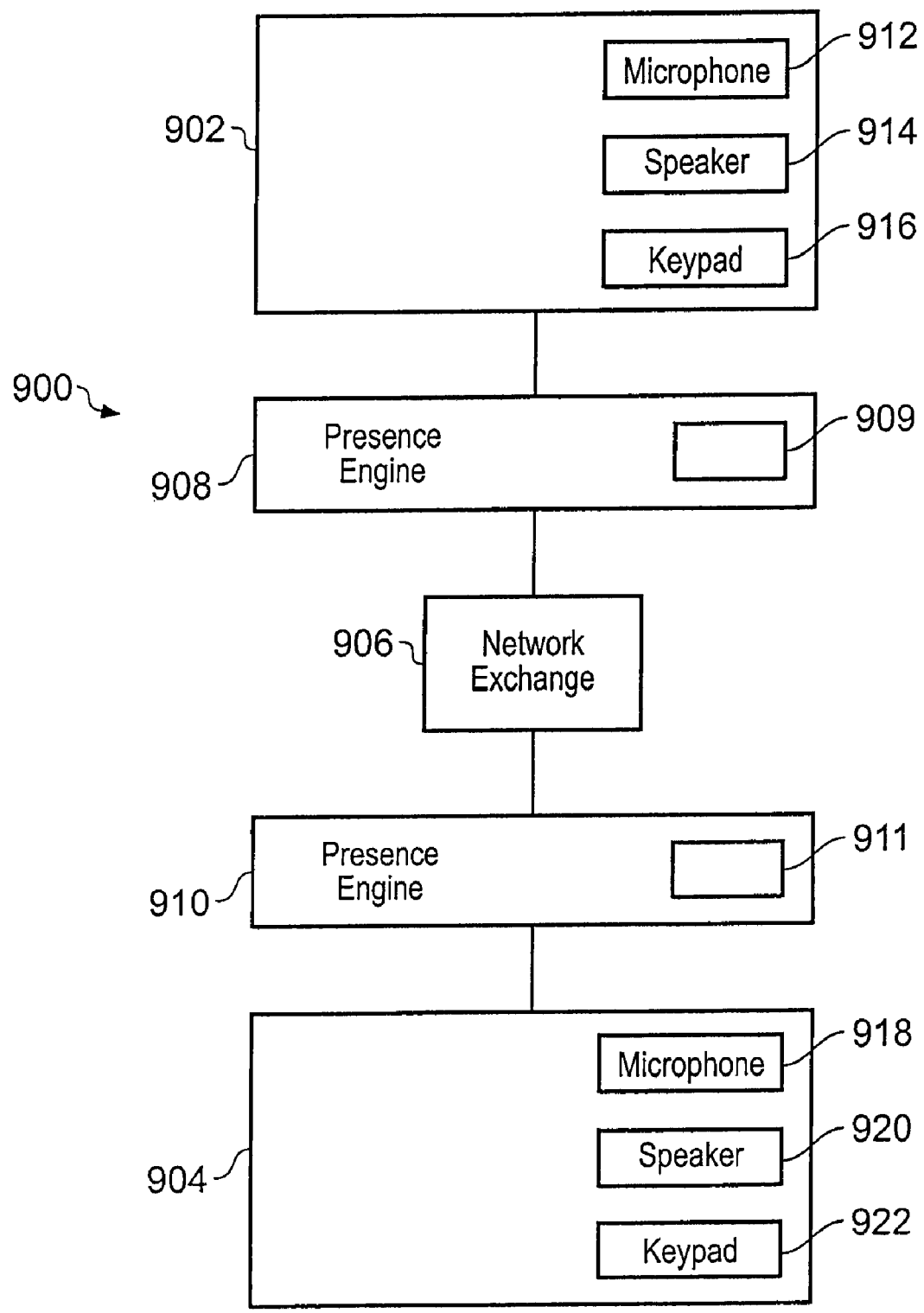
FIG. 9 illustrates an embodiment of another communications network.

FIG. 9 shows schematically another embodiment of a communications network 900. The network 900 comprises a first landline telephone 902, second landline telephone 904, and network exchange 906. A first presence engine 908 is situated in the communications channel between the first landline telephone 902 and the network exchange 906, and a second presence engine 910 is situated in the communications channel between the second landline telephone 904 and the network exchange 906. Each presence engine 908, 910 has memory 909, 911 associated with it. The presence engines 908, 910 are application programming interfaces (APIs) stored in a computer memory that may be located on any device (existing or retrofitted) in the communications path between the first landline telephone 902 and the second landline telephone 904.

The first and second landline telephones 902, 904 provide a direct or established connection into the network 900 and are effectively "dumb terminals" configured for terminating voice calls over the network 900. Each landline telephone 902, 904 comprises a microphone 912, 918, a speaker 914, 920 and a keypad 916, 922. The landline telephones 902, 904 do not have any application programs running on them as such: they are configured for receiving and making regular voice telephony calls (for example using GSM, VoIP, or other suitable standard).

The presence engines 908, 910 are configured to automatically encode communications availability status/presence information into a voice channel. Where a user of the first landline telephone 902 wishes to manage the communications availability status of the first landline telephone 902 they use the landline telephone 902 to interact with the first presence engine 908 by pressing buttons on the keypad 916 and/or by speaking into the microphone 912. In this example, a user of the first landline telephone 902 accesses the presence engine by dialing a specific predefined number with the keypad 916.

The first presence engine 908 is situated between the first landline telephone 902 and the network exchange 906 and is configured to recognize that the dialed number is in relation to presence information. Upon recognition that the dialed number is in relation to presence information, the presence engine 908 terminates the call and does not attempt to route the call over the network 900. Any dialed numbers that are not in relation to presence information are allowed to pass through the presence engine 908 to the network exchange 906 unaffected.

When the first presence engine 908 recognizes that a dialled number is in relation to presence information, the presence engine 908 is configured to send a signal to the first landline telephone 902 that will cause the user of the first landline telephone 902 to be presented with a first list of options in relation to communications availability status. The options are presented to the user as an automated audio message by the speaker 914 associated with the landline telephone 902. In this embodiment, the options presented to the user are:

1) Set communications availability status; and
2) Check communications availability status.

The user may select one of the options by pressing the corresponding number on the keypad 916 on the landline telephone 902, and/or by speaking the number of the option that they want to select into the microphone 912, and a signal indicative of the user's selection is sent to the presence engine 905. When the first presence engine 908 receives a signal indicative of the user's selection, the first presence engine 908 decodes that signal, for example by determining which key was pressed and/or by applying voice recognition software to the user's speech.

If the user has selected option 1) to set their own communications availability status, the presence engine 908 sends a signal to the first landline telephone 902 that causes the user to be presented with a further list of options:
1) Online;
2) Offline.

Once again, the user can select which of the two options they wish to select by using the keypad 916 and/or the microphone 912 in the first landline telephone 902, and the presence engine 908 is configured to store in memory 909 the communications availability status associated with the first landline telephone 902. If the user selects option 2) from the first list of options to check the communications availability status of the landline telephone 902 that they are using, the presence engine 908 is configured to retrieve the communications availability status associated with the landline telephone 902 from memory 909 and generate a signal representative of the communications availability status that can be sent to the landline telephone 902 such that it will cause the speaker 914 to output an audio signal representative of the communications availability status.

When a user of the first landline telephone 902 wishes to make a call to the second landline telephone 904, they dial the telephone number corresponding to the second landline telephone 904. The first presence engine 908 allows calls to pass through it unaffected as it is not recognized as an instruction to manage communications availability status. The second presence engine 910 recognizes that the call is for a landline telephone that utilizes communications availability status information and whose communications availability status is managed by that presence engine 910. Also, the presence engine 910 automatically recognizes that the communications availability status of the second landline telephone 904 should be considered before the call is set up.

The second presence engine 910 retrieves the communications availability status information for the second landline telephone from memory 911. If the communications availability status of the second landline telephone 904 is "online", the second presence engine 910 enables a call to be set up between the first landline telephone 902 and the second landline telephone 904 in the usual way—in this example by causing the second landline telephone 904 to ring. When the communications availability status of the called landline telephone is "online", the presence engines are transparent to the users of the landline telephones.

If the communications availability status of the second landline telephone 904 is "offline", the second presence engine 910 is configured to prevent the call from being set up between the first landline telephone 902 and the second landline telephone 904 by preventing the second landline telephone from ringing. In this embodiment the second presence engine 910 is configured to generate a signal that is subsequently sent back to the first landline telephone 902 that causes the speaker 914 to provide the user of the first landline telephone 902 with an audio message informing the user that the called party (second landline telephone 904) is offline.

In some embodiments, the second presence engine 910 may be configured to generate a signal that provides the user of the first landline telephone 902 with an option to leave a voicemail message, for example the speaker 914 of the first landline telephone 902 may output an automated audio message that says "Telephone number 0368451264 is currently offline. Please press 1 to leave a voicemail message".

When the communications availability status of the second landline telephone 904 has been recorded as "offline" it will not be possible for the second landline telephone 904 to receive incoming calls. However, in some embodiments certain users/types of call (for example emergency calls) may be capable of being routed to the second landline telephone 904 even when the second landline telephone 904 is recorded as "offline".

This embodiment enables communications availability status information to be built in to the voice channel of existing regular telephony systems. Although FIG. 9 has been described in relation to landline telephones, and telephony calls between landline telephones, it will be appreciated that this embodiment is equally applicable to mobile telephones as well as many other types of communications device and that the features of this embodiment can be used in combination with features of any other embodiment described herein.

One or more landline telephones may be associated with the same presence engine, and the memory associated with the presence engine may be configured for storing communications availability status for a plurality of landline telephones. The presence engine may be located in a logical layer that is underneath the landline telephone, and may conveniently be located within any module, or device, or computer, or server within the network 900, optionally within the network exchange 906.

It will be appreciated that any of the examples of different availability status options discussed above can be used with this embodiment, and that any of the optional features of any of the embodiments described herein could also be provided with one or more of any of the other embodiments described herein.

In view of the foregoing description it will be evident to a person skilled in the art that various modifications may be made within the scope of the invention. For example, with reference to the process illustrated by FIG. 7, applications requiring or utilizing availability status information may be recorded as part of the general operation of a mobile communications device and updated at any time, so for example the record may be made before log in, and updated after log in and during PTT operation.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or rewriteable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identify module, tape, cassette solid-state memory. The computer program may be supplied from a remote source embodied in the communications medium such as an electronic signal, radio frequency carrier wave or optical carrier waves. Such carrier media are also envisaged as aspects of the present invention.

It will be appreciated that any of the application programs, or any other logical module, may be made up of more than one functional unit that may be distributed across more than one server/computer. The one or more server computers may or may not be in the same physical location.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for data processing system and process that include presence configuration, identification and determination through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

The invention claimed is:

1. A device for a communications network comprising:
   an application program configured to utilize availability status of a user;
   a communications interface configured to transmit data directly to another device; and
   a presence engine configured to obtain data representative of the availability status of the user from the application program in a native format specific to the application program, translate the obtained data from the native format to a generic format independent of the application program, provide the communications interface with the data representative of the availability status of the user in the generic format, and cause the communications interface to transmit the translated data in the generic format directly to another device.

2. The device of claim 1, wherein the communications network is a peer-to-peer network.

3. The device of claim 1, wherein the device comprises a mobile computing device.

4. A device for a communications network, the device comprising:
   a plurality of application programs configured to utilize availability status of a user;
   a communications interface configured to receive data directly from another device, wherein the received data is in a generic format independent of the plurality of application programs; and
   a presence engine configured to determine which of the plurality of application programs have been recorded as utilizing the availability status of the user, translate the received data representative of the availability status of a the user from the generic format to one or more native formats specific to each application program that has been recorded as utilizing the availability status of the user, and provide each of the application programs that have been recorded as utilizing the availability status of the user with the translated data in the native formats specific to each application program.

5. The device of claim 4, wherein the communications network is a peer-to-peer network.

6. The device of claim 4, wherein the device comprises a mobile computing device.

7. A method of operating a device for a communications network comprising:
   obtaining, by the device, data representative of an availability status of a user in relation to an application program configured to utilize availability status of a user, wherein the obtained data representative of the availability status is in a native format specific to the application program;
   translating, by the device, the obtained data representative of the availability status of the user from the native format specific to the application program to a generic format independent of the application program; and
   sending the translated data representative of the availability status of the user in the generic format from the device directly to another device.

8. The method of claim 7, wherein the communications network is a peer-to-peer network.

9. The method of claim 7, wherein the device comprises a mobile computing device.

10. A method of operating a device for a communications network comprising:
- receiving by the device, data representative of an availability status of a user directly from another device, wherein the received data is in a generic format independent of a plurality of application programs;
- determining, by the device, which of the plurality of application programs have been recorded as utilizing the availability status of the user;
- translating, by the device, the received data representative of the availability status of a the user from the generic format to one or more native formats specific to each application program that has been recorded as utilizing the availability status of the user; and
- providing each of the application programs that have been recorded as utilizing the availability status of the user with the translated data in the native formats specific to each application program.

11. The method of claim 10, wherein the communications network is a peer-to-peer network.

12. The method of claim 10, wherein the method is performed by a mobile computing device including a wireless communications module, the wireless communication module configured for a telephony operation.

13. A computer-readable storage medium storing instructions for operating a device for a communications network, the instructions when executed cause one or more processors to perform steps of:
- obtaining data representative of an availability status of a user in relation to an application program configured to utilize availability status of a user, wherein the obtained data representative of the availability status is in a native format specific to the application program;
- translating the obtained data representative of the availability status of the user from the native format specific to the application program to a generic format independent of the application program; and
- sending, directly to another device, the translated data representative of the availability status of the user in the generic format.

14. The computer-readable storage medium of claim 13, wherein the communications network is a peer-to-peer network.

15. The computer-readable storage medium of claim 13, wherein the device comprises a mobile computing device.

16. A computer-readable storage medium storing instructions for operating a device for a communications network, the instructions when executed cause one or more processors to perform steps of:
- receiving data representative of an availability status of a user directly from another device, wherein the received data is in a generic format independent of a plurality of application programs;
- determining which of the plurality of application programs have been recorded as utilizing the availability status of the user;
- translating the received data representative of the availability status of a the user from the generic format to one or more native formats specific to each application program that has been recorded as utilizing the availability status of the user; and
- providing each of the application programs that have been recorded as utilizing the availability status of the user with the translated data in the native formats specific to each application program.

17. The computer-readable storage medium of claim 16, wherein the communications network is a peer-to-peer network.

18. The computer-readable storage medium of claim 16, wherein the device comprises a mobile computing device including a wireless communications module configured for a telephony operation.

\* \* \* \* \*